(12) United States Patent
Shishido

(10) Patent No.: US 6,772,145 B2
(45) Date of Patent: Aug. 3, 2004

(54) SEARCH METHOD IN A USED CAR SEARCH SUPPORT SYSTEM

(75) Inventor: Hironobu Shishido, c/o Tsubasa System Co., Ltd., 25-14, Kameido 2-chome, Koto-ku, Tokyo 136-8507 (JP)

(73) Assignee: Hironobu Shishido, Tokyo (JP)

( * ) Notice: Subject to any disclaimer, the term of this patent is extended or adjusted under 35 U.S.C. 154(b) by 179 days.

(21) Appl. No.: 09/823,352

(22) Filed: Mar. 30, 2001

(65) Prior Publication Data

US 2002/0023076 A1 Feb. 21, 2002

(30) Foreign Application Priority Data

Aug. 17, 2000 (JP) ........................................ 2000-247796

(51) Int. Cl.[7] .............................................. G06F 17/30
(52) U.S. Cl. ............................................. 707/3; 707/10
(58) Field of Search ................................ 707/1, 2, 3, 4, 707/5, 10; 705/26

(56) References Cited

U.S. PATENT DOCUMENTS

| | | | | |
|---|---|---|---|---|
| 4,992,940 A | * | 2/1991 | Dworkin ..................... | 705/26 |
| 5,774,873 A | * | 6/1998 | Berent et al. ................ | 705/26 |
| 5,978,776 A | * | 11/1999 | Seretti et al. ................ | 705/26 |
| 6,041,310 A | | 3/2000 | Green et al. ................. | 705/27 |
| 6,286,002 B1 | | 9/2001 | Axaopoulos et al. ......... | 707/10 |
| 6,385,602 B1 | * | 5/2002 | Tso et al. .................... | 707/3 |

FOREIGN PATENT DOCUMENTS

| | | | | |
|---|---|---|---|---|
| CA | 2288745 | 11/1999 | .......... | G06F/17/30 |
| EP | WO 00/08571 | 2/2000 | .......... | G06F/17/30 |
| JP | 05-307571 | 11/1993 | .......... | G06F/15/40 |
| JP | 06223117 A | 8/1994 | .......... | G06F/15/40 |
| JP | 07-078099 | 3/1995 | .......... | G06F/12/00 |
| JP | 10-031684 | 2/1998 | .......... | G06F/17/30 |
| JP | 10-149392 | 2/1998 | | |
| JP | 11025164 A | 1/1999 | .......... | G06F/17/60 |
| JP | 11161659 A | 6/1999 | .......... | G06F/17/30 |

OTHER PUBLICATIONS

Jan. 31, 2003 Japanese Offical Action re: Japanese Patent Application No. 2000–247796, and translation.

Internet Search Results re: searching cars and secondhand cars of each marker with color, production year and attachment queries (pp. 176–179), and English abstract.

J.C. Shafer & R. Agrawal, "Continuous querying in database–centric Web spplications", Computer Networks 33 (2000) 519–531.

* cited by examiner

*Primary Examiner*—Diane D. Mizrahi
(74) *Attorney, Agent, or Firm*—Morgan & Finnegan LLP

(57) ABSTRACT

A search method in a used car search support system in which when search conditions are inputted from a client, a server delivers the hit number for each price range to the client and when a user designates a desired price range via the client, the server sends the used car information of the designated price range to the client.

2 Claims, 8 Drawing Sheets

FOR MODEL ○○○○,VEHICLES FROM XX THOUSAND YEN TO XX THOUSAND YEN ARE RECORDED

VEHICLES SATISFYING THE CONDITIONS ARE AS FOLLOWS

| | MODEL | MODEL YEAR | TYPE | DISTANCE TRAVELED | ... | PRICE |
|---|---|---|---|---|---|---|
| 1 | ○○○○ | H8 | AAA | 35000 | | 95 |
| 2 | ○○○○ | H8 | AAA-XX | 28000 | | 85 |
| 3 | ○○○○ | H8 | AAA-YY | 41000 | | 80 |
| .. | | | | | | |

FIG. 4

SEARCH METHOD IN A USED CAR SEARCH SUPPORT SYSTEM

This application is based on Patent Application No. 2000-247796 filed Aug. 17, 2000 in Japan, the content of which is incorporated hereinto by reference.

BACKGROUND OF THE INVENTION

1. Field of the Invention

The present invention relates to a search method in a used car search support system providing used car information about salable used cars online.

2. Description of the Related Art

Conventionally, a computer system is well known that stores inventory information about used cars, allows an operator to input search conditions such as a desired price of a purchaser, and displays used car information meeting the search conditions. In such a computer system, the search for used cars is carried out by inputting a manufacturer, model, price, model year, distance traveled, and the like as the search conditions.

Although the price is an important factor for a purchaser to search for the used cars, the price (or the ratio to the price of the new model) differs greatly depending on the model. As for particular models, the prices vary sharply depending on their popularity. Generally, since a new model after the full model change brings about an image of the cars with that model, the popularity of an old model is likely to be lost when the new model is unpopular.

It is usually difficult for persons not engaging in the used car business to search for the used cars efficiently because they do not know their price levels. In addition, as for exclusive cars, since they have wide price ranges, an input price range is not necessarily an absolute condition. In such a case, valuable items for a purchaser can be missed because they are out of the price range.

Although a computer system is proposed that sets a price range for each article so that a purchaser can select the price ranges for the individual articles (Japanese patent application laid-open No. 10-149392 (1998), see FIG. 4), setting such price ranges in advance is not so effective because of the large variations in the prices of used cars.

SUMMARY OF THE INVENTION

Therefore, an object of the present invention is to provide a search method in a used car search support system capable of searching for used car information efficiently.

According to one aspect of the present invention, there is provided a search method in a used car search support system that includes a database storing used car information, receives search conditions from an external device, and provides the external device with used car information satisfying the search conditions, the search method in which the used car search support system executes steps of: searching for price information in the used car information that satisfies search conditions other than prices of the search conditions; and providing the external device with price range information based on the search results.

Here, the price range information may be about a maximum price and a minimum price.

The search method in the used car search support system may further comprise the steps of: dividing the used car information that satisfies the search conditions other than the price of the search conditions into prescribed price ranges; counting the number of data in each price range of the used car information; providing the external device with the number of data counted and a corresponding price range as the price range information; receiving information about the price range from the external device; and supplying the external device with the used car information corresponding to the price range indicated by the received information about the price range.

When the number of data of the used car information satisfying the search conditions is greater than a predetermined number, the division in accordance with the predetermined price ranges may be skipped, and all the data of the used car information that satisfy the search conditions may be output.

According to the present invention, even if no external instruction is given to retrieve price related information, when the search conditions other than the price are given, the used car search support system retrieves information satisfying the search conditions from its used car information, such as a price range from a lowest to highest price, or a plurality of price ranges, and supplies the information to the external device. Thus, the user of the external device does not have to examine the used car information obtained as a result of the search, in order to change the search conditions such as the price range for the re-retrieval. Therefore, the user can carry out the retrieval of the used car information efficiently.

According to the present invention, when a sufficient amount of the used car information matching the search conditions is obtained, the re-retrieval is unnecessary. Thus, since the search results are supplied to the external device immediately, the user of the external device is released from useless search operation.

The above and other objects, features and advantages of the present invention will become more apparent from the following description of embodiments thereof taken in conjunction with the accompanying drawings.

BRIEF DESCRIPTION OF THE DRAWINGS

FIG. 4 is a diagram illustrating a display example of a retrieved result on a client side;

DETAILED DESCRIPTION OF PREFERRED EMBODIMENTS

Figure 1:
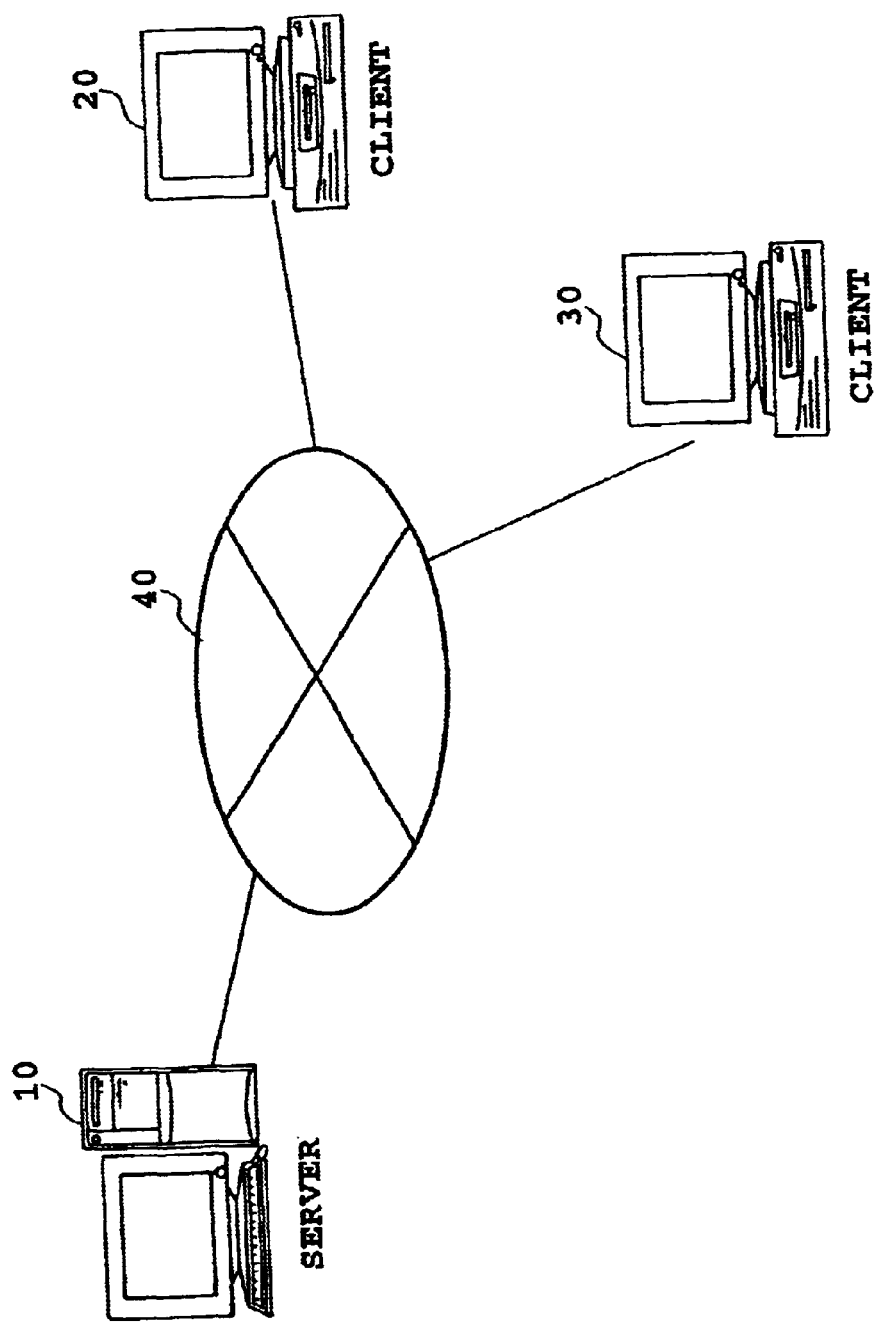
FIG. 1 is a block diagram showing a configuration of the entire system of an embodiment in accordance with the present invention.

FIG. 1 shows a configuration of the entire system in accordance with the present invention. In FIG. 1, a server 10 and clients 20 and 30 are connected to a communications network 40. As a used car search support system in accordance with the present invention, the server 10 provides information about salable used cars. The client 20 is installed on the side of the general public who wish to purchase used cars (including juridical persons). The client 20 sends search conditions to the server 10, receives a retrieved result from the server 10 and displays it. The client 20 and 30 are arranged on the side of those who wish to sale used cars, and send used car information to the server 10 to be recorded. As for the communications network 40, although it is the Internet in the present embodiment, this is not essential. Other well-known communications networks can also be employed such as LAN, leased telephone circuits and the like.

Figure 2:
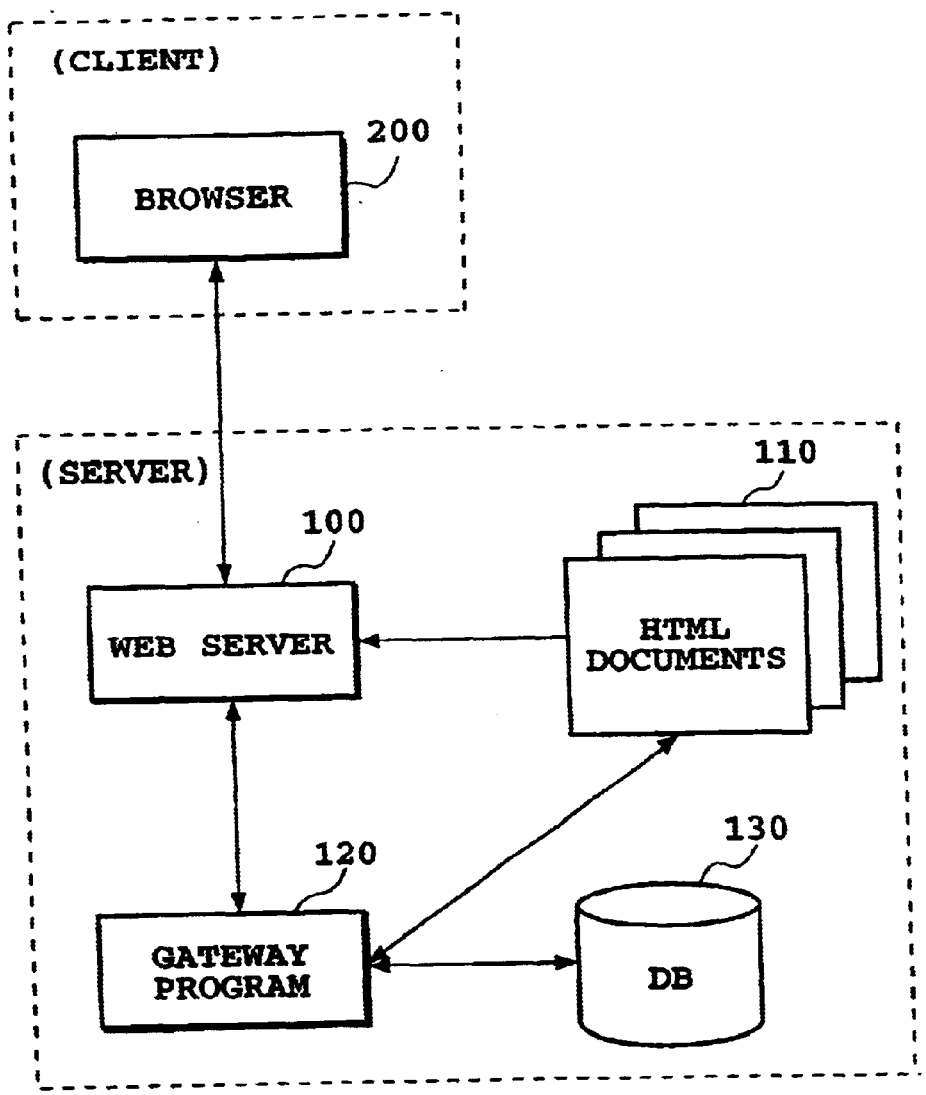
FIG. 2 is a block diagram showing a configuration of software of the embodiment in accordance with the present invention.

Next, a software configuration of the server 10 and the clients 20 and 30 will be described with reference to FIG. 2. In the present embodiment, the server 10 provides a home page through which it records the used car information about used cars to be sold, and retrieves the used car information about used cars to be purchased. To achieve this, the server 10 stores, in its storage like hard disks, HTML documents 110 to be displayed on a used car information entry screen or on a used car information retrieval screen.

To perform communications with the clients 20 and 30, the server 10 has communications software called WEB server. A server 100, which will be described later, carries out communications with a browser 200 installed in the clients 20 and 30. A main function of the WEB server 100 is to transfer an information processing instruction sent from the browser 200 to a gateway program 120. In addition, receiving a call instruction to read the HTML documents from the browser 200, the WEB server 100 reads the HTML documents 110, and transmits them to the clients 20 and 30.

The gateway program 120 is one of well-known information processing programs such as CGI and SSI, and executes the information processing instruction requested from the browser 200. The information processing includes the following.

(1) The four basic operations of arithmetic and logic operations.

(2) Read/write and retrieval of information from or to a database (DB) 130.

Here, the SSI program can change the contents of the HTML documents.

The database 130 stores the used car information sent from the client 30, and personal information about companies and persons possessing the used car information.

The browser mounted on the clients 20 and 30 is a well known program that analyzes the HTML documents, and displays the information defined in the HTML documents in a prescribed format. Besides, the browser executes the information processing specified by the HTML documents.

Typical information processing instructions described in the HTML documents, so-called tags, include the following functions.

(a) Displaying character strings described in the HTML documents.

(b) Requiring and displaying images on the server 10, addresses of the images being described in the HTML documents.

(c) Instructing the content of the information processing to the gateway program of the server 10, such as a retrieve command.

(d) Processing such as receiving information from the server 10, and displaying the information on the display screen in accordance with the display position specified by the HTML document.

(e) Processing for receiving the information input from the keyboard or mouse of the client 20, and for executing the tags specified by the HTML documents. A processing in response to a button operation is well known as the processing executed in connection with the forgoing (b).

(f) Transmission of information inputted from a user or information described in the HTML documents to the server 10.

Although the browser 200 can execute various other information processings, since they are not associated with the present invention and obvious to those skilled in the art, the detailed description thereof is omitted here.

On the basis of the foregoing, the used car information retrieval service by the server 10 will be described.
(First Retrieval Method)

Figure 7:
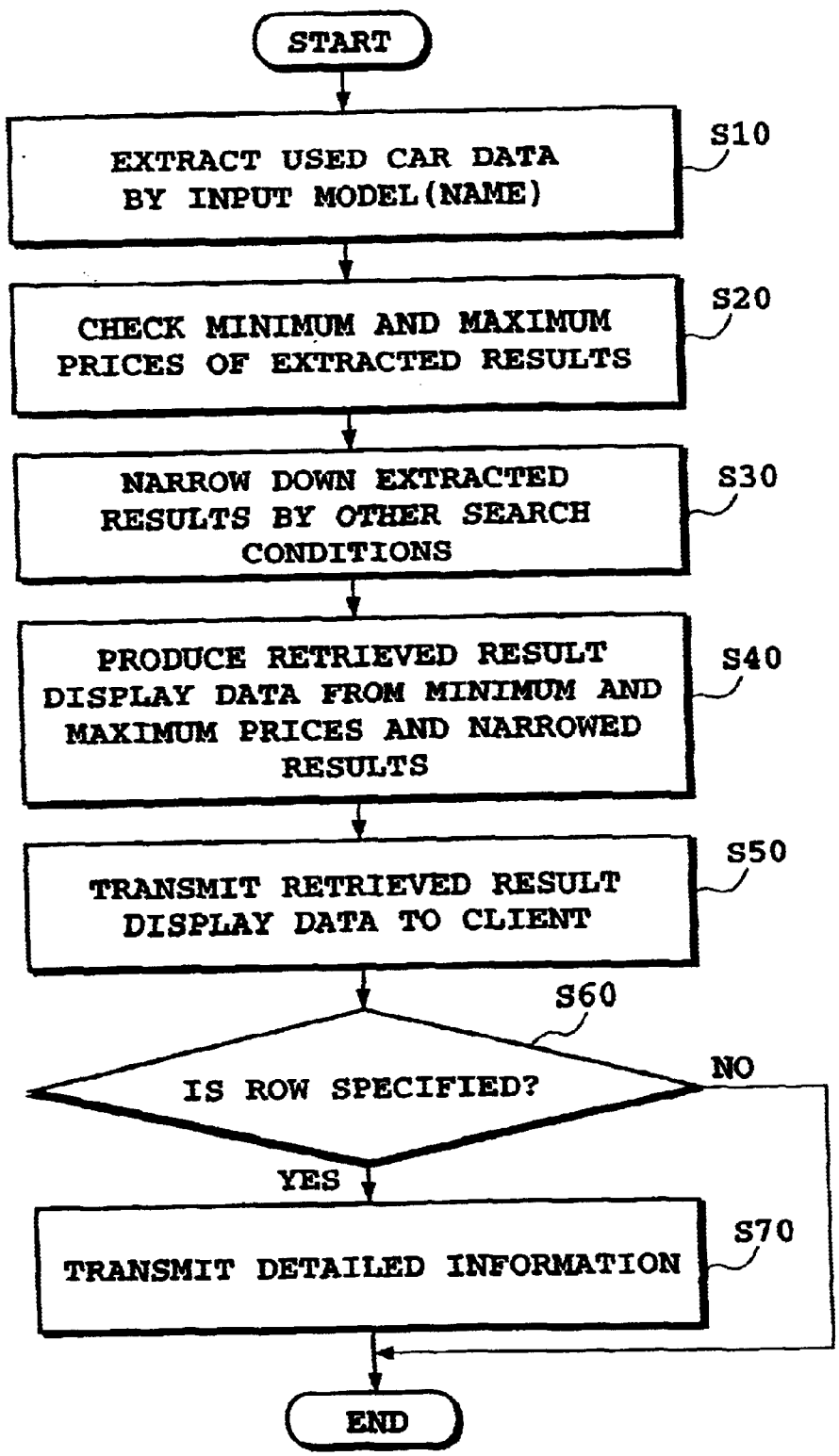
FIG. 7 is a flowchart illustrating a processing of a server.

FIG. 7 illustrates the processing of the server 10 for performing the retrieval using the first retrieval method. A person who wishes to obtain the used car information (called a searcher from now on) causes the browser 200 of the client 20 to display the home page (the highest layer HTML document in the HTML documents) on the server 10. Subsequently, the searcher calls out the HTML document for inputting the search conditions with the button operation, thereby bringing about the display as shown in FIG. 3.

Figure 3:
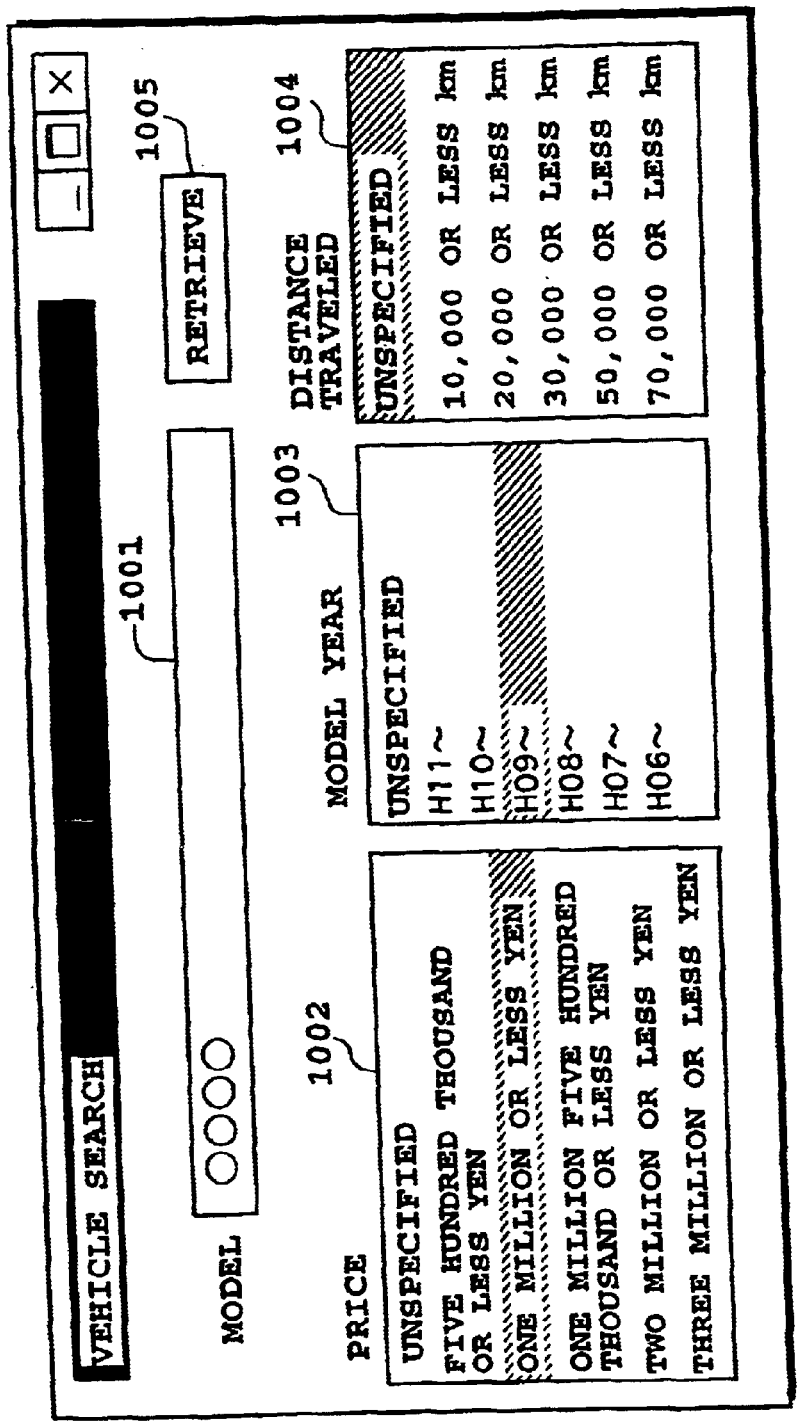
FIG. 3 is a diagram illustrating a search condition input screen on a client side.

In FIG. 3, the reference numeral 1001 designates a model name input block to which a model name is input from the keyboard. The reference numeral 1002 designates a price setting block; 1003 designates a year type setting block; 1004 designates a distance setting block; and 1005 designates a retrieval button. The information items in the price setting block 1002, year type setting block 1003 and distance setting block 1004 are displayed using an information processing scheme called list-box. The list-box is a graphical user interface that displays a plurality of selection candidates, and that when one of them is selected using the mouse, generates identification information corresponding to the selected candidates. The HTML documents can also use the list-box, and has a tag for displaying the list-box. After selecting the candidates in the blocks 1002–1005 (shaded portions in FIG. 3), the searcher operates the retrieval button 1004.

In response to the operation, and in accordance with the definition of the tag of the HTML documents, the model name and the chosen candidates are transmitted to the server 10 as the search conditions of the used car information, along with the search execution instruction.

The gateway program 120 in the server 10 searches the database 130 for the used car information matching the model name in the search conditions sent from the client 20, and retrieves the used car information corresponding to the model name (step S10). The result is temporarily stored in the internal memory in the server 10 as a first retrieved result.

Subsequently, the gateway program 120 examines the maximum and minimum prices in the first retrieved results temporarily stored in the internal memory by using a sorting technique (step S20).

Then, the gateway program 120 extracts from the first retrieved results the used car information matching the price, the year model and the distance traveled selected by the searcher (second retrieval) (step S30).

Finally, the gateway program 120 prepares display data (HTML documents, in this case) for displaying the minimum price, maximum price and second retrieved result, and transmits the display data to the client 20 (step S40→S50).

Receiving the HTML documents, the client 20 displays them as shown in FIG. 4.

When the searcher specifies one of the rows on the display screen in FIG. 4 with the mouse, the used car information in the selected row is transmitted from the server 10 to the client 20 (step S60→S70). The screen of FIG. 4 displays in a table style the maximum and minimum prices in the used car information satisfying the search conditions, along with the data about the predetermined items in the used car information in the form of a table.

On the other hand, when the searcher operates an end button not shown, the procedure as shown in FIG. 7 is terminated, and the processing defined by the HTML documents such as returning to the top page is executed (step S60→end).

(Second Retrieval Method)

Figure 8:
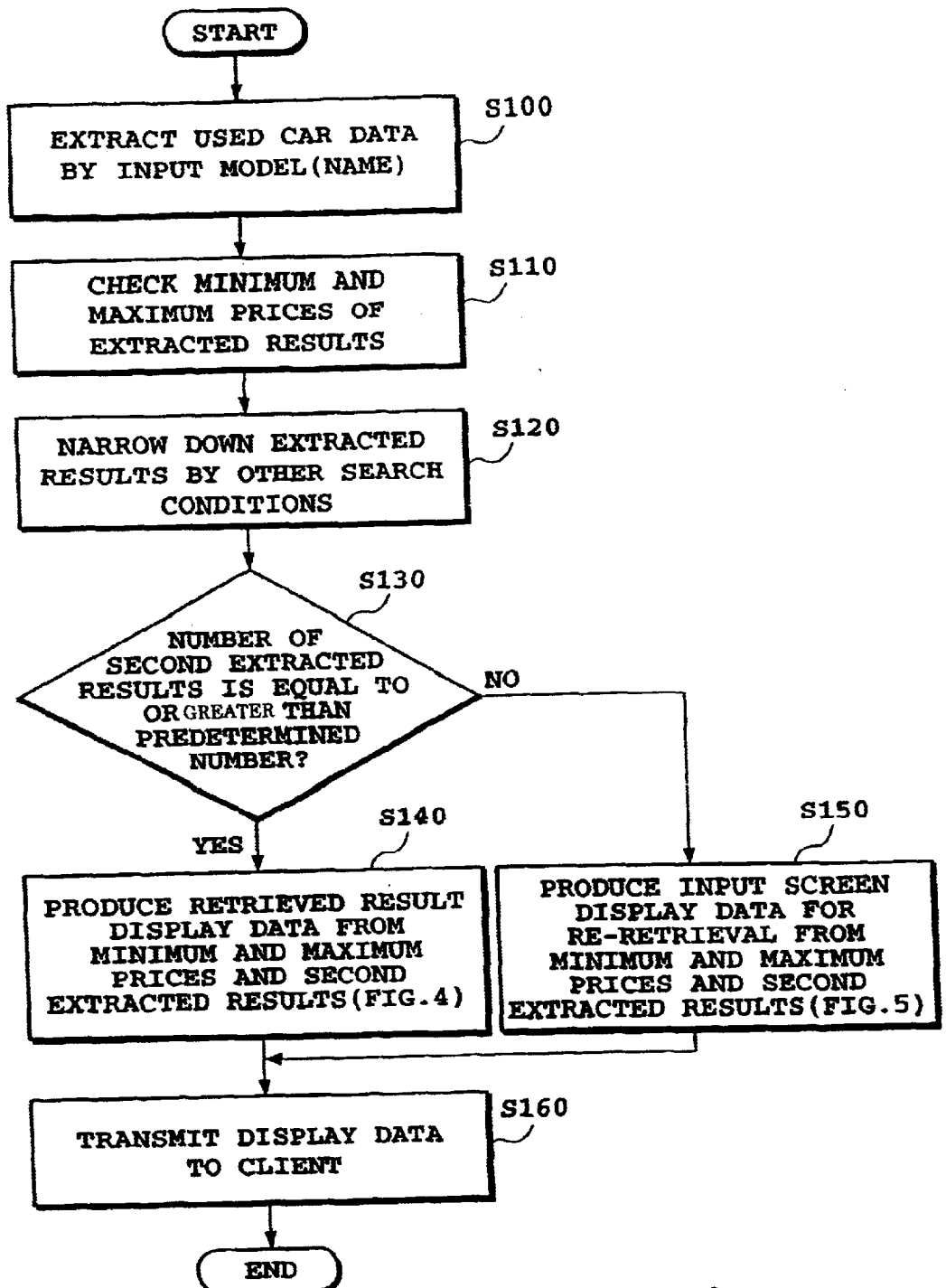
FIG. 8 is a flowchart illustrating a processing of a server.

In the second retrieval method, the searcher also inputs the search conditions using the search condition input screen as shown in FIG. 3. However, the retrieval processing the server 10 carries out differs from that of the first retrieval method. FIG. 8 illustrates the processing of the second retrieval method. The gateway program 120 of the server 10 carries out the first extraction of the used car information satisfying the search conditions given on the search condition input screen of FIG. 3 from the database 130. In the course of this, the number of data of the extracted used car information is counted (step S100).

Subsequently, the maximum price and minimum price in the first extracted used car information is detected (step S110).

Afterward, the first extracted used car information is divided in accordance with the price in the used car information at every predetermined price step, say at every one hundred thousand yen. In the present embodiment, the used car information is divided into the ranges of 500 thousand to 600 thousand, 600 thousand to 700 thousand, etc., and is stored in the internal memory. In this case, a plurality of price ranges are set at every one hundred thousand between the minimum price and the maximum price detected above, and the information memory areas of the internal memory are set in accordance with the price ranges. Then, the price range is decided to which the price of each item of the first extracted used car information belongs, so that the item of the used car information is copied in the information memory area corresponding to the price range in the internal memory. In this case, the number of data of the used car information in each price range is counted. After the entire first extracted used car information is divided in accordance with the price range, the number of data in each price range is counted (step S120).

In the present embodiment, the display format of the retrieved result varies depending on whether the number of the first extracted results is greater than a predetermined number or not.

When the number of the first retrieved results is greater than the predetermined number, they are displayed as shown in FIG. 4 in the same manner as the first retrieval method.

Figure 5:
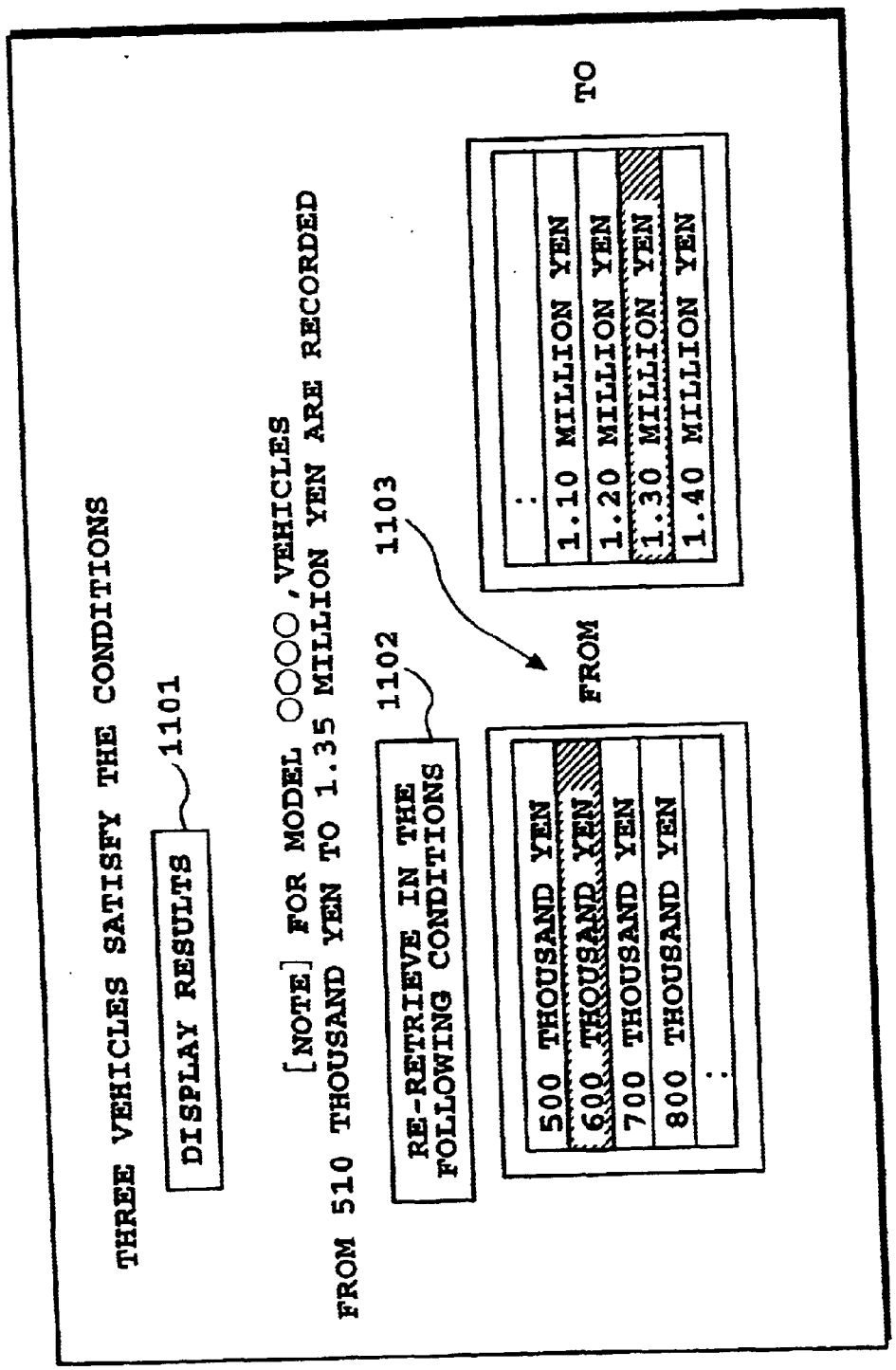
FIG. 5 is a diagram illustrating a display example of a retrieved result on a client side.

On the other hand, when the number of the retrieved results is less than the predetermined number, they are displayed as shown in FIG. 5. In FIG. 5, the number of the data of the extracted used car information is displayed as the first retrieved results. The display screen of FIG. 5 will briefly be described. The reference numeral 1101 designates a button for instructing to display the detail of the used car information. When the user operates the button 1101, all the first extracted results retrieved by the server are displayed.

The reference numeral 1102 designates a button for instructing to carry out re-retrieval. When the user operates the re-retrieval button 1102, the third retrieval is carried out on the basis of the second extracted results in accordance with the search conditions instructed by the list 1103 (step S130→S150).

The reference numeral 1103 designates a graphical user interface called a list-box for selecting a price range. The list-box 1103 displays a plurality of price ranges so that the user can specify a desired price range in terms of maximum and minimum prices with the mouse. In the example of FIG. 5, the price range from 600 thousand yen to one million and 300 yen is designated as the search condition.

The user operates the button 1101 to display all the first retrieved results of the used car information, or instructs to perform the re-retrieval with the button 1102 after designating the search condition in the list-box 1103.

The gateway program 120 of the server 10 executes the information processing instructed on the screen of FIG. 4 or 5, and sends the information processing results back to the client 20. The client 20 displays the information processing results transmitted from the server 10, that is, the first retrieved results or third retrieved results (step S160).

(Third Retrieval Method)

Figure 6:
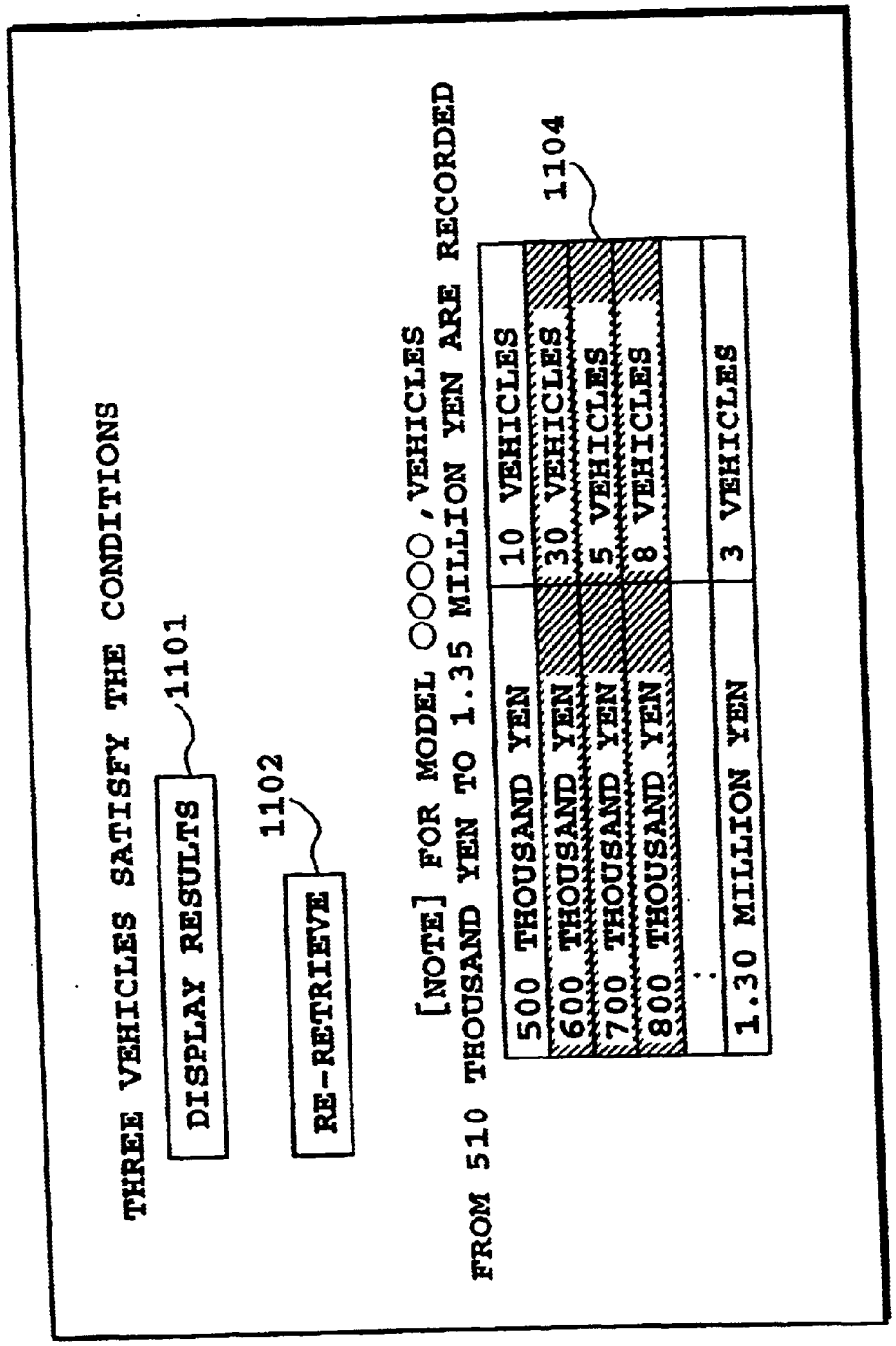
FIG. 6 is a diagram illustrating a display example of a retrieved result on a client side.

In the third retrieval method, the client 20 also inputs the search conditions from the search condition input screen of FIG. 3. In addition to the first retrieval method (see, FIG. 7), the server 10 detects the number of the data in each price range at step S30. Specifically, in the processing at step S10-S20, the used car information satisfying the search conditions is extracted, and the pieces of the used car information are divided into the price ranges at every 100 thousand step to be stored. In parallel with this, the number of data in each price range of the used car information is counted. Such second retrieved results are sent to the client 20, and are displayed as shown in FIG. 6. In the screen of FIG. 6, there are provided the button 1101 for displaying the first retrieved results, the re-retrieval button 1102, and the list-box 1104 that displays the first retrieved results, so that the user can set the price range for the re-retrieval in the list-box with the mouse.

The HTML documents for displaying the used car information retrieved by the retrieval method on the screen as shown in FIGS. 4–6 are transmitted from the server 10 to the client 20 under the control of the gateway program 120.

To display the retrieved results, one of the following two methods can be employed. As for the first method, the server 10 transmits to the client 20 the HTML documents specifying the format of the character strings and that of the table (the numbers of rows and columns) to be displayed, along with the retrieved results to be displayed in the table. Using the HTML documents and the retrieved results, the browser of the client 20 generates the image by combining them.

As for the second method, the server 10 embeds into the retrieved results the HTML documents specifying the format of the character strings and that of the table (the numbers of rows and columns) to be displayed, and transmits the HTML documents to the client 20. A creator of the home page can determine the method to be adopted.

The following variations can be implemented in addition to the foregoing embodiment.

1) Although the server 10 provides the client 20 with the used car information service via the communications network in the foregoing embodiment, an integrated computer system can be constructed in which the server 10 has the functions of the client 20.

Furthermore, instead of transforming the information online through the communications network, the information can be carried offline using a floppy disk or CD-ROM.

2) Although the information is transferred via the HTML documents in the foregoing embodiment, it can be transferred in the form of other markup language documents like XML documents, script and objects using program languages.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A search method in a used car search support system that includes a database storing used car information, receives search conditions from an external device, and provides the external device with used car information satisfying the search conditions, the search method in which the used car search support system executes steps of:

searching firstly for price information in the used car information that satisfies search conditions other than prices of the search conditions;

providing the external device with price range information based on search results of the first search;

inputting a price condition from the external device;

searching secondly in said search results of the first search with the inputted price condition;

providing the external device with search results of the second search;

dividing the used car information that satisfies the search conditions other than the price of the search conditions into prescribed price ranges;

counting the number of data in each price range of the used car information;

providing the external device with the number of data counted and a corresponding price range as the price range information;

receiving information about the price range from the external device;

supplying the external device with the used car information corresponding to the price range indicated by the received information about the price range wherein the number of data of the used car information satisfying the search conditions is greater than a predetermined number, the division in accordance with the prescribed price ranges is skipped, and all the data of the used car information that satisfy the search conditions are output.

2. The search method in the used car search support system as claimed in claim 1, wherein the price range information is about a maximum price and a minimum price.

* * * * *

UNITED STATES PATENT AND TRADEMARK OFFICE
CERTIFICATE OF CORRECTION

PATENT NO. : 6,772,145 B2
DATED : August 3, 2004
INVENTOR(S) : Hironobu Shishido It is certified that error appears in the above-identified patent and that said Letters Patent is hereby corrected as shown below:

Title page,
Item [73], Assignee, delete "Hironobu Shishido, Tokyo (JP)" and insert the following:
-- Tsubasa System Co., Ltd., Tokyo, Japan --

Signed and Sealed this

Twenty-sixth Day of July, 2005

JON W. DUDAS
*Director of the United States Patent and Trademark Office*